D. B. ROGERS.
Cultivator-Teeth.
No. 4,245.
Patented Nov. 1, 1845.
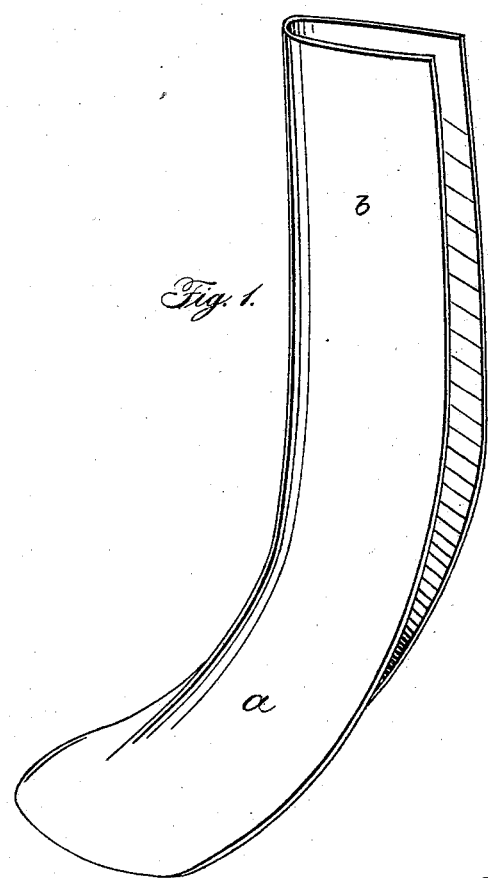
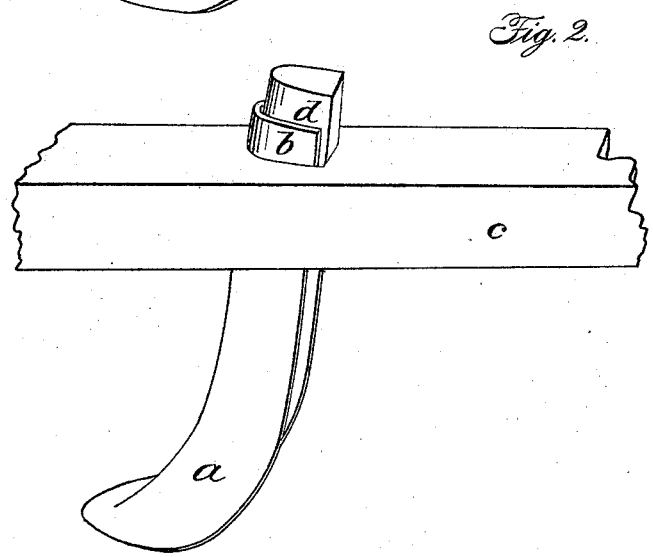

UNITED STATES PATENT OFFICE.

DAVID B. ROGERS, OF STAFFORD, NEW YORK.

IMPROVEMENT IN CULTIVATOR-TEETH.

Specification forming part of Letters Patent No. 4,245, dated November 1, 1845.

*To all whom it may concern:*

Be it known that I, DAVID B. ROGERS, of Stafford, in the county of Genesee and State of New York, have invented a new and useful Improvement in the Mode of Constructing Cultivator-Teeth; and I do hereby declare that the following is a full, clear, and exact description thereof, reference being had to the accompanying drawings, which form a part of said description, in which—

Figure 1 is a view of the perfect tooth. Fig. 2 is a tooth attached to the beam of a cultivator, ready for use.

The nature of my invention consists of forming a tooth and its shank entire out of a thin flat plate of steel, the shank being bent up so that its cross-section horizontally will be of a U form. This allows a wooden key to be driven into its hollow part, that wedges it in the mortise of the beam in all directions, the sides of the tooth being sprung out against the sides of the mortise by said key. The lower part, *a*, of the tooth is of the ordinary shape, and the upper part, *b*, of the same width, is bent up with its edges parallel with each other, so as to form in its cross-section a figure similar to the letter U, as is clearly represented in Fig. 1, the point of the cultivator is turned to a proper curve, and the whole is ready to be attached to the beam. To attach said tooth to the beam *c*, Fig. 2, the shank is put up into the mortise made to receive it loosely, and a wooden wedge, *d*, is then driven into the recess on the back of the tooth, which tightens it firmly in both directions, forcing it forward and spreading its sides against the mortise in the beam.

Having thus fully described my improvements, what I claim as my invention, and desire to secure by Letters Patent, is—

The shank of the tooth so formed of thin metal as to receive a wedge in its recess, in the manner described, for the purpose of firmly connecting it with the beam in all directions, as set forth.

DAVID B. ROGERS.

Witnesses:
I. P. ROSS,
J. J. GREENOUGH.